United States Patent
Isobe et al.

(10) Patent No.: US 10,095,961 B2
(45) Date of Patent: Oct. 9, 2018

(54) PRINT CONTROL APPARATUS, PRINTING SYSTEM, AND NON-TRANSITORY COMPUTER READABLE MEDIUM

(71) Applicant: FUJI XEROX CO., LTD., Tokyo (JP)

(72) Inventors: Kimihiko Isobe, Kanagawa (JP); Kenichiro Hotokeishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/358,874

(22) Filed: Nov. 22, 2016

(65) Prior Publication Data

US 2017/0372179 A1     Dec. 28, 2017

(30) Foreign Application Priority Data

Jun. 24, 2016    (JP) ................................. 2016-125654

(51) Int. Cl.
    *G06K 15/02*        (2006.01)
    *G06K 15/00*        (2006.01)

(52) U.S. Cl.
CPC ....... *G06K 15/1823* (2013.01); *G06K 15/007* (2013.01); *G06K 15/022* (2013.01); *G06K 15/1805* (2013.01); *G06K 15/1806* (2013.01); *G06K 15/402* (2013.01)

(58) Field of Classification Search
CPC .................................................. G06K 15/1823
USPC ........................................................ 358/1.15
See application file for complete search history.

(56) References Cited

U.S. PATENT DOCUMENTS

| | | | | |
|---|---|---|---|---|
| 6,094,546 A | * | 7/2000 | Nakazato | ............... G06K 15/12 399/1 |
| 9,056,512 B1 | * | 6/2015 | Kanzaki | ................... B41J 2/125 |
| 2010/0316426 A1 | * | 12/2010 | Takahashi | ............. G06F 3/1212 400/76 |
| 2011/0242557 A1 | * | 10/2011 | Sato | ...................... G06F 3/1207 358/1.9 |
| 2017/0087903 A1 | * | 3/2017 | Yamabe | .................... B41J 2/01 |

FOREIGN PATENT DOCUMENTS

| | | |
|---|---|---|
| JP | 2007-331178 A | 12/2007 |
| JP | 2011-192149 A | 9/2011 |
| JP | 2012-146291 A | 8/2012 |

* cited by examiner

*Primary Examiner* — Jacky X Zheng
(74) *Attorney, Agent, or Firm* — Oliff PLC

(57) ABSTRACT

A print control apparatus includes an acquisition unit and a setup execution unit. The acquisition unit acquires, from a portable terminal, setting of an apparatus condition of an image forming apparatus that performs printing on continuous paper and of a print start time at which the image forming apparatus starts the printing. The setup execution unit starts a setup process for the image forming apparatus such that the setup process is completed by the print start time on the basis of the setting of the apparatus condition acquired by the acquisition unit. The setup process is performed for the image forming apparatus to perform the printing.

7 Claims, 5 Drawing Sheets

PRINT CONTROL APPARATUS, PRINTING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-125654 filed Jun. 24, 2016.

BACKGROUND

Technical Field

The present invention relates to a print control apparatus, a printing system, and a non-transitory computer readable medium.

SUMMARY

According to an aspect of the present invention, there is provided a print control apparatus including: an acquisition unit that acquires, from a portable terminal, setting of an apparatus condition of an image forming apparatus that performs printing on continuous paper and of a print start time at which the image forming apparatus starts the printing; and a setup execution unit that starts a setup process for the image forming apparatus such that the setup process is completed by the print start time on a basis of the setting of the apparatus condition acquired by the acquisition unit, the setup process being performed for the image forming apparatus to perform the printing.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail below with reference to the drawings.

Figure 1:
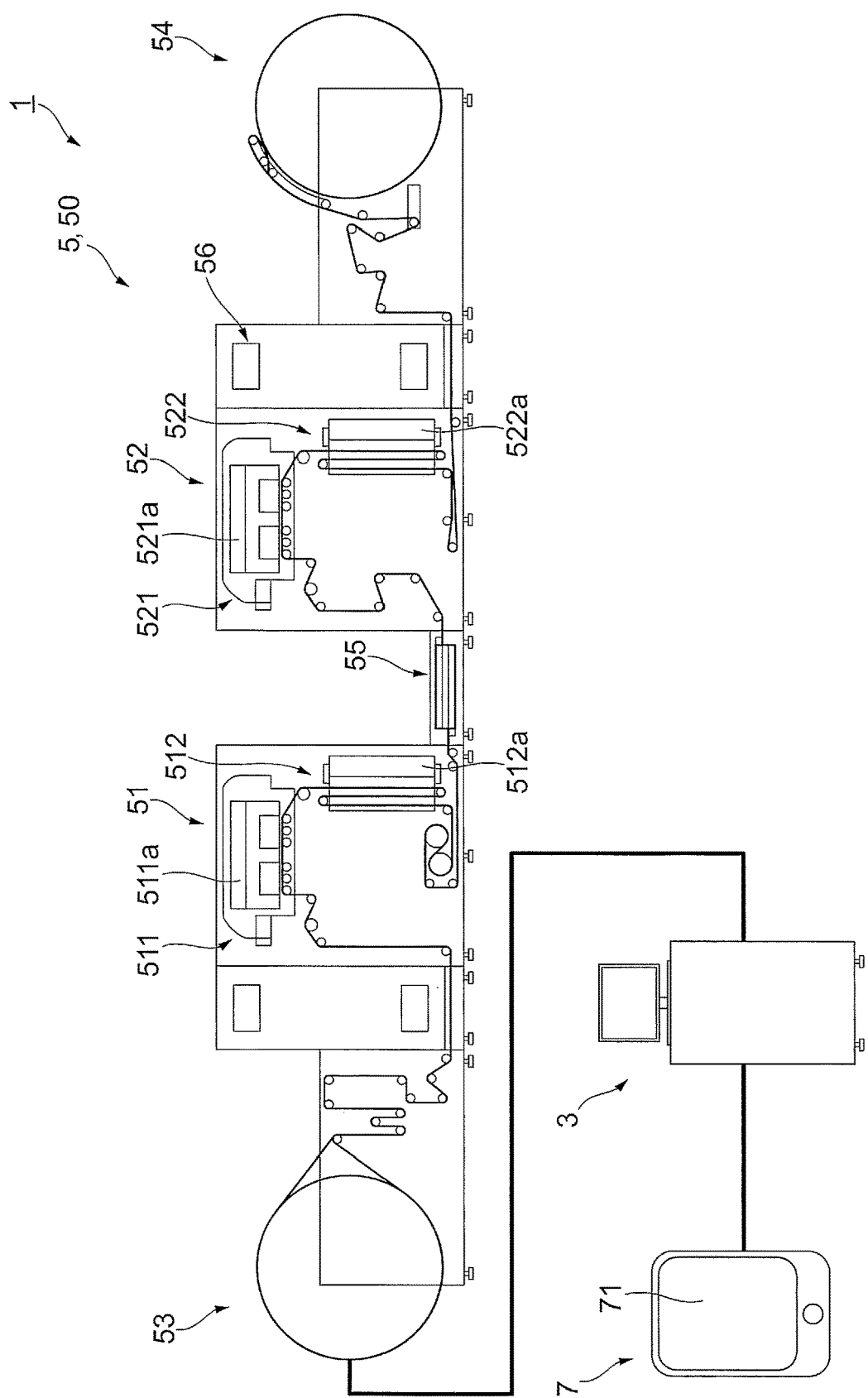
FIG. 1 illustrates an example of the overall configuration of an image forming system according to an exemplary embodiment.

FIG. 1 illustrates an example of the overall configuration of an image forming system 1 according to an exemplary embodiment.

As illustrated in FIG. 1, the image forming system (printing system) 1 according to the exemplary embodiment includes a print server 3 and an image forming apparatus 5. The print server 3 is an example of the print control apparatus, and manages a print job, which is a process based on a print instruction, etc. The image forming apparatus 5 executes a print process (image forming process) for continuous paper under control by the print server 3. The image forming system 1 also includes a portable terminal 7. The portable terminal 7 is provided separately from the print server 3 and the image forming apparatus 5. An operator inputs an instruction for the print server 3 or the image forming apparatus 5 to the portable terminal 7. In the image forming system 1, the print server 3 and the image forming apparatus 5 are connected so as to be communicable with each other via a wired or wireless communication line. The print server 3 and the portable terminal 7 are connected so as to be communicable with each other via a wireless communication line.

The print server 3 receives a print instruction and print data from a client personal computer (PC) or the like. Then, the print server 3 transmits the received print data to the image forming apparatus 5, and causes the image forming apparatus 5 to execute a print process. In addition, the print server 3 performs a setup process for the image forming apparatus 5 on the basis of an instruction from the portable terminal 7.

The image forming apparatus 5 acquires print data from the print server 3, and forms an image and outputs the image to continuous paper on the basis of the acquired print data.

The portable terminal 7 is constituted of a smartphone, for example. The portable terminal 7 includes a display panel 71 and a controller 80 (see FIG. 2 to be discussed later). The display panel 71 displays information for the operator, and receives an input from the operator. The controller 80 controls various sections of the portable terminal 7. The portable terminal 7 outputs information to the print server 3 on the basis of an input from the operator, and displays information on the display panel 71 on the basis of an output from the print server 3.

As illustrated in FIG. 1, the image forming apparatus 5 according to the exemplary embodiment includes plural units. Specifically, the image forming apparatus 5 includes a first image forming unit 51 and a second image forming unit 52. The first image forming unit 51 forms an image on one surface of the continuous paper being transported. The second image forming unit 52 forms an image on the other surface of the continuous paper being transported. The image forming apparatus 5 also includes a paper feed unit 53, a recovery unit 54, and a reverse unit 55. The paper feed unit 53 supplies the continuous paper to the first image forming unit 51. The recovery unit 54 recovers the continuous paper, on which an image has been formed by the second image forming unit 52, by winding up the continuous paper. The reverse unit 55 transports the continuous paper, on which an image has been formed by the first image forming unit 51, to the second image forming unit 52 with the front and back sides of the continuous paper reversed. In the following description, the first image forming unit 51, the second image forming unit 52, the paper feed unit 53, the recovery unit 54, and the reverse unit 55 which constitute the image forming apparatus 5 are occasionally referred to simply as "units 50".

The image forming apparatus 5 further includes an operation panel 56 and a controller 60 (see FIG. 2 to be discussed later). The operation panel 56 receives information from the operator, and displays information for the operator. The controller 60 controls operation of the units 50 which constitute the image forming apparatus 5, and communicates with the print server 3.

The first image forming unit 51 includes an image forming section 511 and a drying section 512. The image forming section 511 injects ink onto the continuous paper to form an image. The drying section 512 dries the ink which is injected onto the continuous paper by the image forming section 511.

The image forming section 511 forms an image on the continuous paper by a so-called "inkjet system". Specifically, the image forming section 511 includes an inkjet head 511a that has plural nozzles, a head heater, a distribution tank, a distribution tank heater, and so forth (none of which is illustrated). The nozzles inject ink as droplets. The head heater heats the ink in the nozzles to a predetermined temperature. The distribution tank distributes the ink to the nozzles. The distribution tank heater heats the ink which is stored in the distribution tank to a predetermined temperature.

The drying section 512 includes a drying heater 512a. The drying heater 512a generates heat when energized, and heats and dries the ink which is injected onto the continuous paper.

The second image forming unit 52 has the same configuration as that of the first image forming unit 51. That is, the second image forming unit 52 includes an image forming section 521 and a drying section 522. The image forming section 521 has an inkjet head 521a, and forms an image on the continuous paper by the so-called inkjet system. The drying section 522 has a drying heater 522a, and dries the ink which is injected onto the continuous paper.

It is necessary for the image forming apparatus 5 according to the exemplary embodiment to perform a setup process for making the units 50 ready for a print process before a print process for the continuous paper is started. The setup process performed by the image forming apparatus 5 will be described later.

Figure 2:
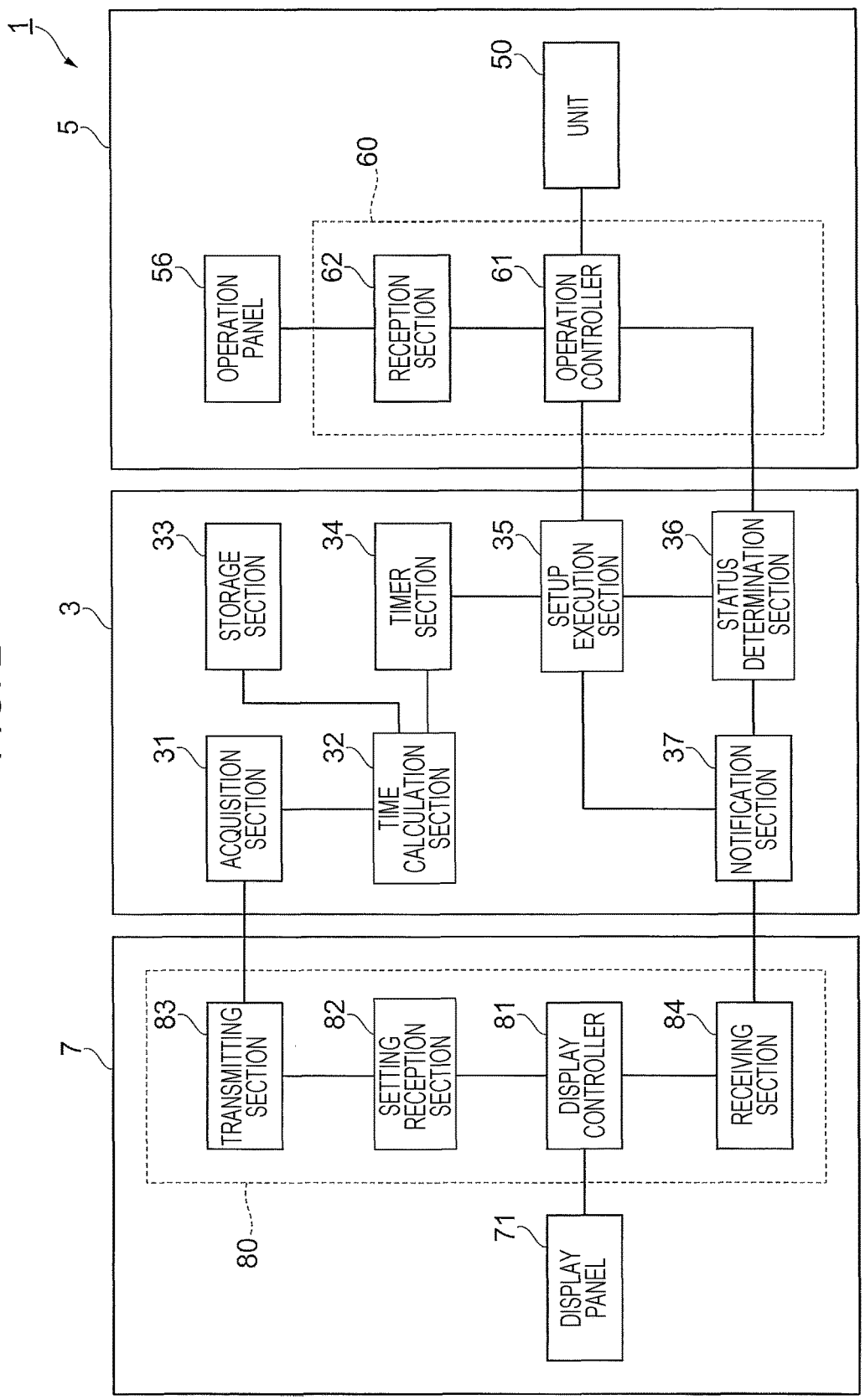
FIG. 2 is a block diagram illustrating functional components implemented by the image forming system according to the exemplary embodiment.

FIG. 2 is a block diagram illustrating functional components implemented by the image forming system 1 according to the exemplary embodiment.

In the image forming system 1, the print server 3, the controller 60 of the image forming apparatus 5, and the controller 80 of the portable terminal 7 each include a central processing unit (CPU), a read-only memory (ROM), and a random-access memory (RAM). The CPU performs a variety of computation processes. The ROM stores a program to be executed by the CPU, various data, and so forth. The RAM is used as a work memory of the CPU.

The print server 3 includes an acquisition section 31 and a time calculation section 32. The acquisition section 31 acquires, from the portable terminal 7, information related to a print start time, at which the image forming apparatus 5 starts print operation, and an apparatus condition of the image forming apparatus 5. The time calculation section 32 calculates a setup start time, at which a setup process for the image forming apparatus 5 is started, on the basis of the information acquired by the acquisition section 31. The print server 3 also includes a storage section 33. The storage section 33 stores the apparatus condition of the image forming apparatus 5 and a required time required for the setup process in correlation with each other. The print server 3 further includes a timer section 34 and a setup execution section 35. The timer section 34 includes a built-in clock, and counts the time. The setup execution section 35 causes the image forming apparatus 5 to start the setup process at the setup start time on the basis of the time counted by the timer section 34. The print server 3 additionally includes a status determination section 36 and a notification section 37. The status determination section 36 determines the status of establishment of the setup process for the image forming apparatus 5. The notification section 37 notifies the portable terminal 7 of the status of start of the setup process by the setup execution section 35, the status of establishment of the setup process determined by the status determination section 36, and so forth.

The acquisition section 31 is an example of the acquisition unit. The acquisition section 31 acquires, as information related to the print start time, a print start time set by the operator via the display panel 71 of the portable terminal 7. The acquisition section 31 also acquires, as information related to the apparatus condition of the image forming apparatus 5, information related to set values of the apparatus conditions of the units 50 of the image forming apparatus 5 set by the operator via the display panel 71 of the portable terminal 7. Specifically, the acquisition section 31 acquires, as information related to the apparatus condition of the image forming apparatus 5, set values such as the number of purge processes to be performed in the inkjet heads 511a and 521a of the first image forming unit 51 and the second image forming unit 52, the heating temperature of the heaters, and the print speed (set operation speed).

The time calculation section 32 is an example of the calculation unit. The time calculation section 32 calculates the setup start time for the image forming apparatus 5 such that the setup process is completed by the print start time on the basis of the information acquired by the acquisition section 31. Specifically, the time calculation section 32 calculates the total required time required for the setup process for the image forming apparatus 5 on the basis of the information related to the set values of the apparatus condition of the image forming apparatus 5 acquired by the acquisition section 31 and the information related to the required time stored in the storage section 33. For example, the total required time is calculated by adding the required time required for the purge processes, the required time required for heating by the heaters, the required time required to adjust the winding tension for the continuous paper, and so forth. Then, the setup start time is calculated by subtracting the calculated total required time from the print start time acquired by the acquisition section 31 (setup start time=print start time−total required time).

The timer section 34 counts the time, and notifies the setup execution section 35 that the setup start time calculated by the time calculation section 32 has been reached when the setup start time is reached.

The setup execution section 35 is an example of the setup execution unit. In the case where the setup start time is reached on the basis of the counting by the timer section 34, the setup execution section 35 starts the setup process for the image forming apparatus 5 via an operation controller 61 to be discussed later on the basis of the apparatus condition of the image forming apparatus 5 acquired by the acquisition section 31. For example, the setup execution section 35 starts the purge processes in the first image forming unit 51 and the second image forming unit 52, and starts heating by energizing the heaters of the first image forming unit 51 and the second image forming unit 52.

The setup execution section 35 also maintains the units 50 of the image forming apparatus 5 in a state in which print operation may be started during a period after the completion of the setup process until the image forming apparatus 5 starts print operation.

The status determination section 36 communicates with the image forming apparatus 5, and determines whether or not the setup process has been started in each unit of the image forming apparatus 5. The status determination section 36 also determines whether or not the setup process has been completed in each unit of the image forming apparatus 5. Specifically, the status determination section 36 determines whether or not a predetermined number of purge processes have been executed in the inkjet heads 511a and 521a of the first image forming unit 51 and the second image forming unit 52, whether or not the heaters have been heated to a predetermined temperature, whether or not the continuous paper is mounted along a predetermined path, with a predetermined winding tension, etc., and so forth.

The notification section 37 is an example of the notification unit. The notification section 37 notifies the controller 80 of the portable terminal 7 of the result of the determination by the status determination section 36. Specifically, the notification section 37 notifies the portable terminal 7 of the start or the completion of the setup process for the image forming apparatus 5.

As illustrated in FIG. 2, the controller 60 of the image forming apparatus 5 includes the operation controller 61 and a reception section 62. The operation controller 61 controls operation of the units 50 on the basis of control by the setup execution section 35 of the print server 3. The reception section 62 receives the start of print operation on the basis of an operation performed by the operator using the operation panel 56.

The operation controller 61 starts heating using the head heater, the distribution tank heater, etc. in the inkjet heads 511a and 521a of the image forming sections 511 and 521, for example, as the setup process, on the basis of the control by the setup execution section 35 of the print server 3. The operation controller 61 also performs a process (purge process) of injecting ink charged into the nozzles in the inkjet heads 511a and 521a, for example, as the setup process. The operation controller 61 further starts heating using the heaters 512a and 522a in the drying sections 512 and 522, for example, as the setup process.

In addition, the operation controller 61 maintains the units 50 of the image forming apparatus 5 in a state in which print operation may be performed, during a period after the completion of the setup process until an instruction to start print operation is provided via the operation panel 56, on the basis of the control by the setup execution section 35.

In the case where an instruction to start print operation is provided by the operator using the operation panel 56 after it is determined by the status determination section 36 of the print server 3 that the setup process for the units 50 of the image forming apparatus 5 has been completed, the reception section 62 receives the start of print operation. In the case where it is determined that the setup process for the units 50 of the image forming apparatus 5 has not been completed, the reception section 62 does not receive the start of print operation.

As illustrated in FIG. 2, the controller 80 of the portable terminal 7 includes a display controller 81 and a setting reception section 82. The display controller 81 controls display on the display panel 71. The setting reception section 82 is an example of the reception unit. The setting reception section 82 receives setting of the print start time for the image forming apparatus 5 and the apparatus condition of the image forming apparatus 5 input by the operator via the display panel 71. The controller 80 of the portable terminal 7 also includes a transmitting section 83 and a receiving section 84. The transmitting section 83 transmits, to the print server 3, the setting of the print start time and the apparatus condition received by the setting reception section 82. The receiving section 84 receives information, of which the receiving section 84 has been notified by the print server 3, such as the status of start of the setup process and the status of establishment of the setup process determined by the status determination section 36.

In the image forming system 1 according to the exemplary embodiment, the image forming apparatus 5 is a large-scale device constituted of the plural units 50. Therefore, the setup process to be performed since the image forming apparatus 5 is turned on to be started until the image forming apparatus 5 starts print operation has plural steps. Examples of the steps of the setup process performed until the image forming apparatus 5 starts print operation include starting the various sections of the image forming apparatus 5, starting heating using the heaters in the image forming sections 511 and 521 and the drying sections 512 and 522, performing a purge process in the image forming sections 511 and 521, making setting of the continuous paper in the units 50, and tuning the mounting condition (paper bail, winding tension) of the continuous paper. In order to perform the setup process in the image forming system 1, a long time (e.g. about 0.5 hours) is required. Further, in the case where the image forming apparatus 5 is not used for a predetermined time even if the setup process is performed once, the setting of the image forming apparatus 5 is initialized, which makes it necessary to perform the setup process again.

In the image forming apparatus 5, the continuous paper is transported at a high speed (e.g. 100 meters/minute). Therefore, in order to reduce a danger due to the image forming apparatus 5 being operated from a location away from the image forming apparatus 5, the operation panel 56 for operation of the image forming apparatus 5 is fixed to the body of the image forming apparatus 5. It is necessary to operate the operation panel 56, which is fixed to the body of the image forming apparatus 5, for the image forming apparatus 5 to start print operation.

Thus, in the case where the setup process for the image forming apparatus 5 is started only after the operator arrives at the front of the operation panel 56, it is necessary for the operator to wait to start print operation by operating the operation panel 56 until the setup process is completed. In this case, the time is wasted, which may disadvantageously lower the productivity.

In the image forming system 1 according to the exemplary embodiment, the print start time, at which the image forming apparatus 5 starts print operation, is set using the portable terminal 7 which is located away from the image forming apparatus 5. The print server 3 calculates a setup process start time, at which the setup process for the image forming apparatus 5 is started, on the basis of the setting of the portable terminal 7 in order to start the setup process in advance.

A process executed by the image forming system 1 according to the exemplary embodiment will be described in detail below. The process performed by the image forming system 1 described below is implemented through cooperation between software and hardware resources. That is, the CPU inside a control computer provided in the portable terminal 7 and the print server 3 executes a program for implementing the functions of the portable terminal 7 and the print server 3 to implement such functions.

Figure 3:
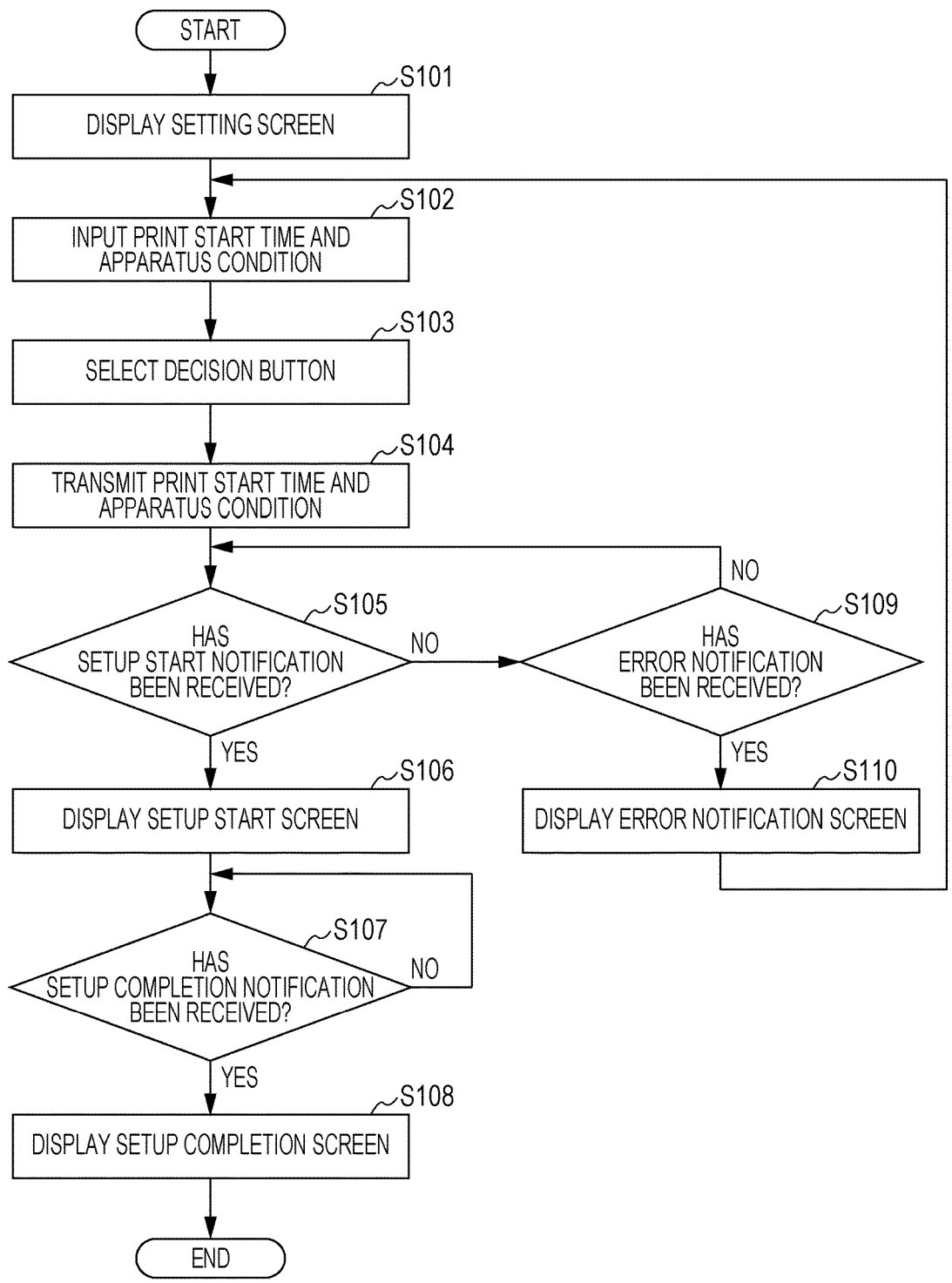
FIG. 3 is a flowchart illustrating a process performed by a controller of a portable terminal according to the exemplary embodiment.
Figure 4C:
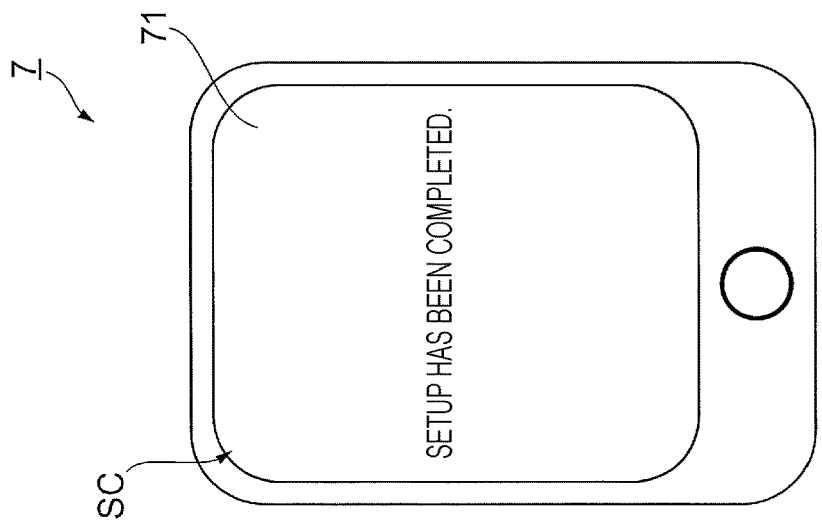
FIGS. 4A to 4C each illustrate an example of an image displayed on a display panel of the portable terminal by a display controller of the controller when the process illustrated in FIG. 3 is performed.
Figure 4B:
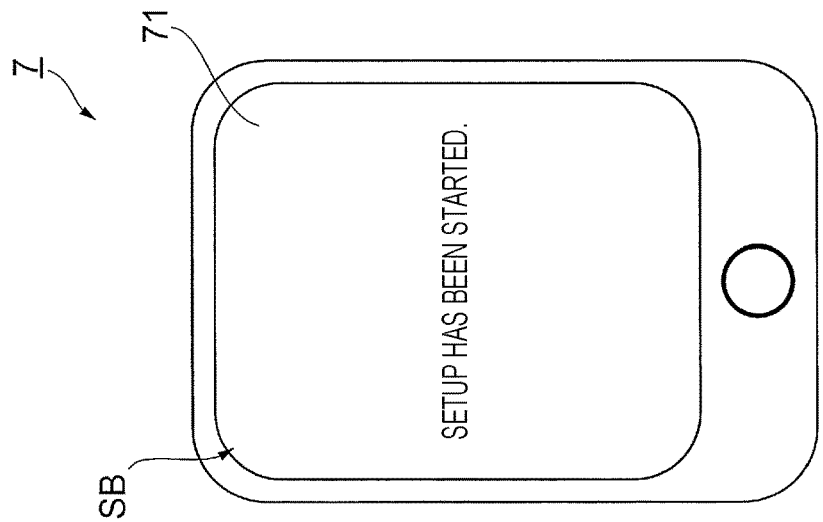
Figure 4A:
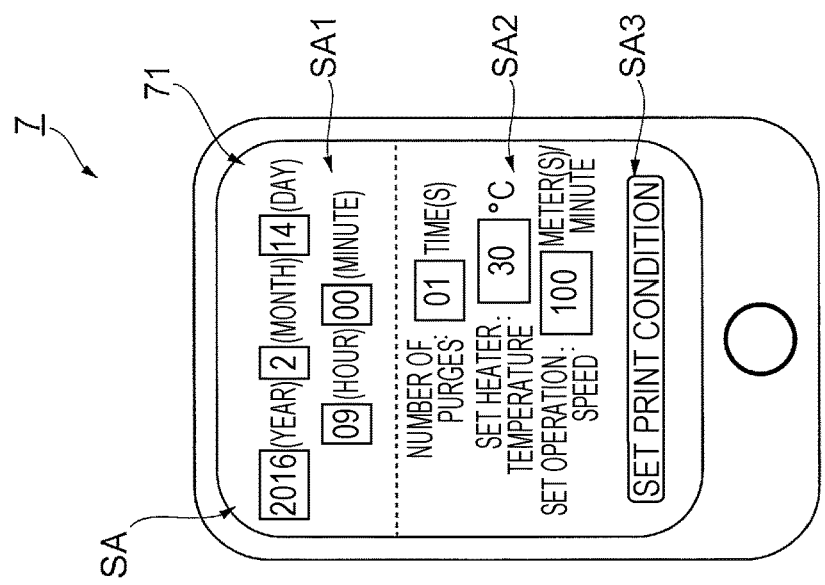

First, a process performed by the controller 80 of the portable terminal 7 will be described. FIG. 3 is a flowchart illustrating a process performed by the controller 80 of the portable terminal 7 according to the exemplary embodiment. FIGS. 4A to 4C each illustrate an example of an image displayed on the display panel 71 of the portable terminal 7 by the display controller 81 of the controller 80 when the process illustrated in FIG. 3 is performed.

When the portable terminal 7 is started, the display controller 81 displays, on the display panel 71, a setting screen SA for setting the print start time for the image forming apparatus 5 and the apparatus condition of the image forming apparatus 5 (step S101).

As illustrated in FIG. 4A, the setting screen SA includes a time setting section SA1, a condition setting section SA2, and a decision button SA3. The time setting section SA1 is used to set the start time at which the image forming apparatus 5 starts print operation. The condition setting section SA2 is used to set the apparatus condition of the image forming apparatus 5. The decision button SA3 is used to decide the content input to the time setting section SA1 and the condition setting section SA2. In this example, the time setting section SA1 includes fields for input of the date (year/month/day) and the time (hour/minute) at which the image forming apparatus 5 starts print operation. In this example, in addition, the condition setting section SA2 includes fields for input of, as examples of the apparatus condition of the image forming apparatus 5, the number of purge processes to be performed in the inkjet heads 511a and 521a of the first image forming unit 51 and the second image forming unit 52 (number of purges: times), the temperature of the head heaters in the inkjet heads 511a and 521a (set heater temperature: ° C.), and the print speed of the image forming apparatus 5 for the continuous paper (set operation speed: meters/minute).

Subsequently, when the operator inputs set values to the time setting section SA1 and the condition setting section SA2 of the setting screen SA (step S102) and selects the decision button SA3 (step S103), the input set values of the print start time and the apparatus condition are received by the setting reception section 82, and such information is transmitted to the print server 3 by the transmitting section 83 (step S104).

In this example, as illustrated in FIG. 4A, "2016 (year) 2 (month) 14 (day) 09 (hour) 00 (minute)" is input to the time setting section SA1 as the print start time. In addition, "(number of purges:) 01 (times)", "(set heater temperature:) 30 (° C.)", and "(set operation speed:) 100 (meters/minute)" are input to the condition setting section SA2 as the apparatus condition of the image forming apparatus 5. When the decision button SA3 is selected, such information is transmitted to the print server 3.

In the print server 3, as discussed in detail later, the time calculation section 32 calculates the setup start time for the image forming apparatus 5 on the basis of the information related to the print start time and the apparatus condition transmitted by the transmitting section 83. Then, the setup process for the image forming apparatus 5 is started at the setup start time on the basis of the control by the setup execution section 35 of the print server 3, and a notification that the setup process has been started (hereinafter referred to as a "setup start notification") is transmitted by the notification section 37 of the print server 3. In the case where the setup process is completed, further, a notification that the setup process has been completed (hereinafter referred to as a "setup completion notification") is transmitted by the notification section 37 of the print server 3.

In the case where the time calculation section 32 is not able to calculate the setup start time, meanwhile, an error notification is transmitted by the notification section 37.

Next, it is determined whether or not the receiving section 84 has received the setup start notification from the notification section 37 of the print server 3 (step S105). In the case where the receiving section 84 has received the setup start notification (YES in step S105), the display controller 81 displays, on the display panel 71, a notification screen (setup start screen SB) indicating that the setup process for the image forming apparatus 5 has been started as illustrated in FIG. 4B (step S106).

In the case where the receiving section 84 has not received the setup start notification (NO in step S105), it is determined whether or not an error notification has been received (step S109). In the case where the receiving section 84 has received the error notification (YES in step S109), the display controller 81 displays, on the display panel 71, an error notification screen (not illustrated) indicating that setting of the print start time has not been completed (step S110). In this case, the process returns to step S102, and the operator inputs set values to the time setting section SA1 and the condition setting section SA2 of the setting screen SA again.

In the case where the receiving section 84 has not received the error notification (NO in step S109), meanwhile, the process returns to step S105 to be continued.

Subsequently, it is determined whether or not the receiving section 84 has received a notification that the setup process has been completed (hereinafter referred to as a "setup completion notification") from the notification section 37 of the print server 3 (step S107). In the case where the receiving section 84 has received the setup completion notification (YES in step S107), the display controller 81 displays, on the display panel 71, a notification screen (setup completion screen SC) indicating that the setup process for the image forming apparatus 5 has been completed as illustrated in FIG. 4C (step S108), and the sequence of processes is ended.

In the case where the receiving section 84 has not received the setup completion notification (NO in step S107), the process returns to step S107 to be continued.

Figure 5:
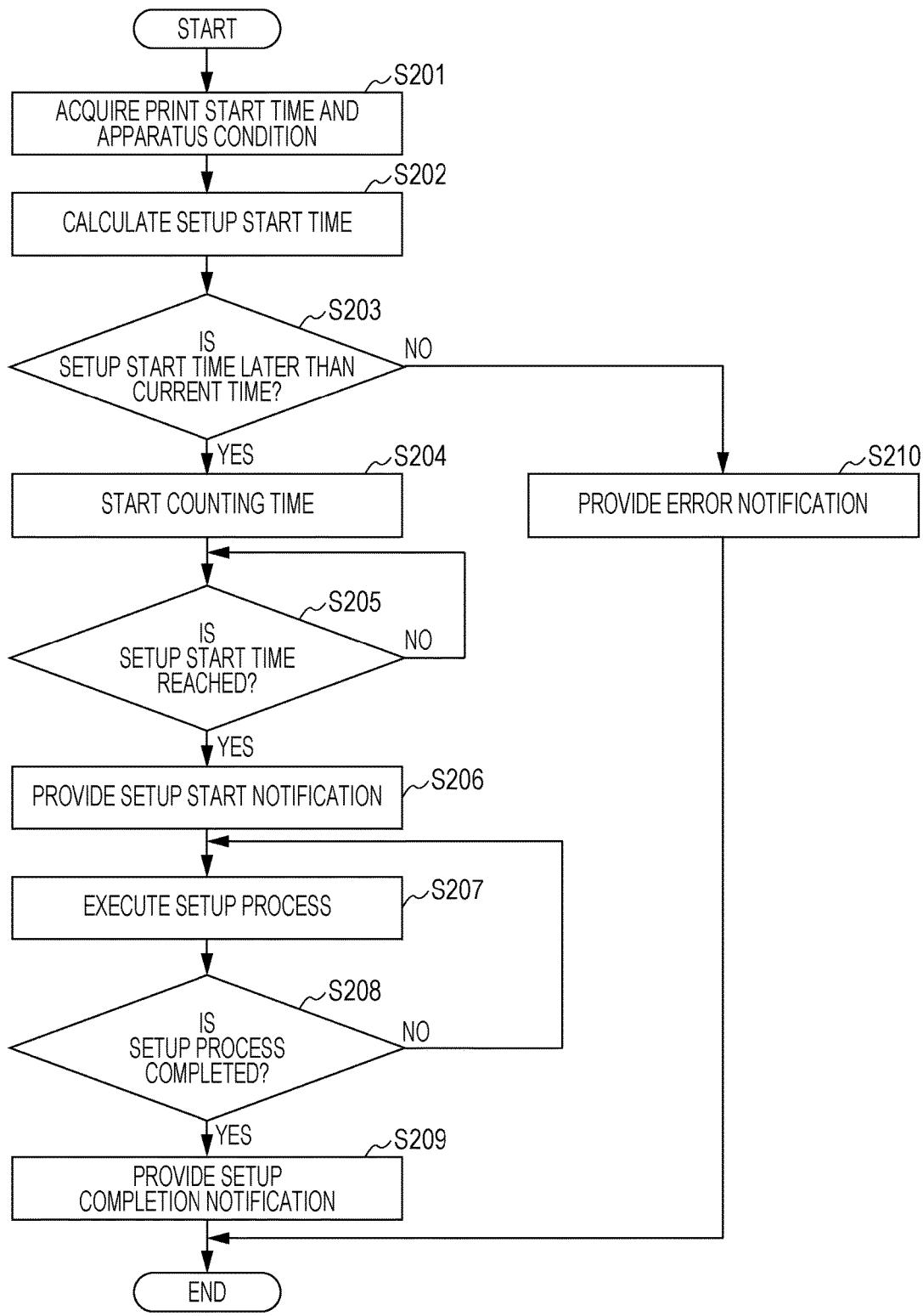
FIG. 5 is a flowchart illustrating a process performed by a print server according to the exemplary embodiment.

Next, a process performed by the print server 3 will be described. FIG. 5 is a flowchart illustrating a process performed by the print server 3 according to the exemplary embodiment.

In the print server 3, when information related to the print start time and information related to the apparatus condition of the image forming apparatus 5 is transmitted by the transmitting section 83 of the portable terminal 7, the acquisition section 31 acquires such information (step S201).

Subsequently, the time calculation section 32 calculates the setup start time for the image forming apparatus 5 on the basis of the information related to the print start time and the information related to the apparatus condition of the image forming apparatus 5, which have been acquired in step S201, and the required time required for the setup process, which is stored in the storage section 33 (step S202).

Specifically, the time calculation section 32 first calculates the total required time required for the setup process for the image forming apparatus 5 in accordance with the relationship between the information related to the apparatus condition of the image forming apparatus 5 acquired in step S201 and the required time required for the setup process for the apparatus conditions of the image forming apparatus 5 stored in the storage section 33. For example, the total required time required for the setup process is calculated by adding the required time required for the purge processes, which are an example of the setup process, the required time required for heating by the heaters, the required time required to adjust the continuous paper, and so forth on the basis of the information related to the apparatus condition of the image forming apparatus 5. Next, the setup start time is calculated by subtracting the calculated total required time from the print start time acquired in step S201 (setup start time=print start time−total required time).

Subsequently, the time calculation section 32 determines, on the basis of the time counted by the timer section 34, whether or not the calculated setup start time is later than the current time (step S203). In the case where the setup start time is not later than the current time, the setup process may not be completed by the print start time. Thus, in the case where the setup start time is not later than the current time (NO in step S203), the notification section 37 provides the portable terminal 7 with a notification (error notification) that the setup process may not be completed by the print start time (step S210).

In the case where the setup start time calculated by the time calculation section 32 is later than the current time (YES in step S203), the timer section 34 starts counting the setup start time (step S204), and determines whether or not the setup start time has been reached (step S205).

In the case where the setup start time has not been reached (NO in step S205), the timer section 34 continues counting the time until the setup start time is reached.

In the case where the setup start time has been reached (YES in step S205), the notification section 37 notifies the portable terminal 7 of the start of the setup process (step S206). In the portable terminal 7, as discussed above, the setup start screen SB (see FIG. 4B) is displayed on the display panel 71 on the basis of the notification of the start of the setup process.

Further, the setup process is executed in the units 50 by the operation controller 61 of the image forming apparatus 5 on the basis of the control performed by the setup execution section 35 (step S207). Specifically, the setup process is performed in the units 50 on the basis of the apparatus condition acquired in step S201 by the control by the setup execution section 35. For example, in the first image forming unit 51 and the second image forming unit 52, heating with the heaters (such as the head heater and the distribution tank heater) of the inkjet heads 511a and 521a is started on the basis of the information related to the heating temperature acquired in step S201. In addition, in the inkjet heads 511a and 521a, a set number of purge processes are performed on the basis of the information related to the number of purge processes acquired in step S201. Further, the mounting condition (paper bail, winding tension) of the continuous paper etc. is adjusted on the basis of the print speed acquired in step S201.

Subsequently, the status determination section 36 determines whether or not the setup process has been completed in the units 50 of the image forming apparatus 5 (step S208). Specifically, the status determination section 36 determines whether or not the heaters have been heated to a predetermined temperature, whether or not a predetermined number of purge processes have been executed, whether or not the continuous paper has been mounted in a predetermined state, and so forth in the first image forming unit 51 and the second image forming unit 52, for example.

In the case where the status determination section 36 determines that the setup process has not been completed (NO in step S208), the process returns to step S207 to continue the setup process.

In the case where the status determination section 36 determines that the setup process has been completed (YES in step S208), the notification section 37 notifies the portable terminal 7 of the completion of the setup process (step S209), and the sequence of processes is ended. In the portable terminal 7, as discussed above, the setup completion screen SC (see FIG. 4C) is displayed on the display panel 71 on the basis of the notification of the completion of the setup process.

In the image forming system 1 according to the exemplary embodiment, as has been described above, the setup start time is calculated and the setup process is started in advance such that the setup process for the image forming apparatus 5 is completed by the print start time which is set by operating the portable terminal 7. Therefore, it is only necessary for the operator to turn to the image forming apparatus 5 and provide an instruction to start print operation using the operation panel 56 when the print start time which has been set using the portable terminal 7 is reached, or upon confirming the setup completion screen SC on the display panel 71 of the portable terminal 7. At the image forming apparatus 5, the operator may start print operation without waiting in front of the image forming apparatus 5, since the setup process has already been completed.

Thus, in the image forming system 1 according to the exemplary embodiment, the setup process for the image forming apparatus 5 may be started in advance by using the portable terminal 7, even in the case where the operation panel 56 of the image forming apparatus 5 is not operated. In the image forming system 1 according to the exemplary embodiment, meanwhile, it is necessary for the operator to operate the operation panel 56, which is provided on the image forming apparatus 5, to start print operation of the image forming apparatus 5 after the completion of the setup process.

In the print server 3 described above, setting of the print start time for the image forming apparatus 5 is received on the portable terminal 7, and the setup start time is calculated such that the setup process is completed by the print start time. However, the process performed by the print server 3 is not limited thereto.

In the print server 3, a setup completion time at which the setup process is completed may be calculated, instead of calculating the setup start time, on the basis of the apparatus condition of the image forming apparatus 5 which is set using the portable terminal 7. That is, in the print server 3, the time calculation section 32 may calculate an expected setup completion time, at which the setup process is completed, by adding the total required time required for the setup process to the current time in the case where the print start time is not input using the portable terminal 7, in the case where the input print start time and the current time are so close that it is difficult to complete the setup process by the print start time, or the like.

In this case, the print server 3 starts the setup process for the image forming apparatus 5, and notifies the portable terminal 7 of the calculated expected setup completion time. In the portable terminal 7, the expected setup completion time, of which the portable terminal 7 has been notified, is displayed on the display panel 71 of the portable terminal 7.

In the exemplary embodiment, the print server 3 is provided separately from the image forming apparatus 5. However, the print server 3 may be provided integrally with the image forming apparatus 5. In other words, the controller 60 which is provided in the image forming apparatus 5 may include the function of the print server 3.

In the exemplary embodiment, a smartphone is used as the portable terminal 7. However, the portable terminal 7 is not limited to a smartphone as long as the portable terminal 7 is operable at a location away from the image forming apparatus 5 or the print server 3 and is capable of communicating with the print server 3. Examples of the portable terminal 7 include a tablet terminal, a cellular phone, a PC, a digital camera, and a so-called wearable terminal that is used as being mounted to the operator.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
a central processor configured to act as:
an acquisition unit that acquires, from a portable terminal, setting of an apparatus condition of an image forming apparatus that performs printing on continuous paper and of a print start time at which the image forming apparatus starts the printing, the apparatus condition including information relating to a number of purge processes;
a setup execution unit that starts a setup process for the image forming apparatus such that the setup process is completed by the print start time on a basis of the setting of the apparatus condition acquired by the acquisition unit, the setup process being performed for the image forming apparatus to perform the printing; and
a reception section that receives an instruction for start of the printing by the image forming apparatus after completion of the setup process, wherein the portable terminal cannot be used for the instruction for the start of the printing after the completion of the setup process,
wherein the central processor is further configured to operate with the image forming apparatus whereby the image forming apparatus performs a print action based upon the instruction for the start of the printing.

2. The print control apparatus according to claim 1, wherein the central processor is further configured to act as:
a calculation unit that calculates a setup start time from a total required time required for the setup process for the apparatus condition acquired by the acquisition unit and from the print start time,
wherein the setup execution unit starts the setup process for the image forming apparatus at the setup start time calculated by the calculation unit.

3. The print control apparatus according to claim 1, wherein the setup execution unit maintains the image forming apparatus in a state in which the setup process has been completed until the image forming apparatus starts the printing.

4. The print control apparatus according to claim 1, wherein the central processor is further configured to act as:
a notification unit that notifies the portable terminal of start and/or completion of the setup process by the setup execution unit.

5. A printing system comprising:
an image forming apparatus that includes an image forming section that performs printing on continuous paper;
a portable terminal that includes a reception unit that receives, from an operator, setting of an apparatus condition of the image forming apparatus and of a print start time for the image forming apparatus, the apparatus condition including information relating to a number of purge processes; and
a print control apparatus that starts a setup process for the image forming apparatus such that the setup process is completed by the print start time on a basis of the setting of the apparatus condition received by the reception unit of the portable terminal, the setup process being performed for the image forming apparatus to perform the printing; and
a reception section that receives an instruction for start of the printing by the image forming section after completion of the setup process by the print control apparatus, wherein the portable terminal cannot be used for the instruction for the start of the printing after the completion of the setup process by the print control apparatus,
wherein the image forming apparatus performs a print action based upon the instruction for the start of the printing.

6. A non-transitory computer readable medium storing a program causing a computer to execute a process comprising:
acquiring, from a portable terminal, setting of an apparatus condition of an image forming apparatus that performs printing on continuous paper and of a print start time at which the image forming apparatus starts the printing, the apparatus condition including information relating to a number of purge processes;
starting a setup process for the image forming apparatus such that the setup process is completed by the print start time on a basis of the acquired setting of the apparatus condition, the setup process being performed for the image forming apparatus to perform the printing;
receiving an instruction for start of the printing after completion of the setup process, wherein the portable terminal cannot be used for the instruction for the start of the printing after the completion of the setup process; and
operating with the image forming apparatus to perform a print action based upon the instruction for the start of the printing.

7. A print control apparatus comprising:
a central processor configured to act as:
an acquisition unit that acquires, from a portable terminal, setting of an apparatus condition of an image forming apparatus that performs printing on continuous paper and of a print start time at which the image forming apparatus starts the printing, the apparatus condition including relating to a winding tension for the continuous paper;
a setup execution unit that starts a setup process for the image forming apparatus such that the setup process is completed by the print start time on a basis of the setting of the apparatus condition acquired by the acquisition unit, the setup process being performed for the image forming apparatus to perform the printing; and
a reception section that receives an instruction for start of the printing by the image forming apparatus after completion of the setup process, wherein the portable terminal cannot be used for the instruction for the start of the printing after the completion of the setup process,
wherein the central processor is further configured to operate with the image forming apparatus whereby the image forming apparatus performs a print action based upon the instruction for the start of the printing.

\* \* \* \* \*